US011612105B2

(12) United States Patent
Zheng et al.

(10) Patent No.: US 11,612,105 B2
(45) Date of Patent: Mar. 28, 2023

(54) KELP HARVESTER

(71) Applicant: Ocean University of China, Qingdao (CN)

(72) Inventors: Zhongqiang Zheng, Qingdao (CN); Zongyu Chang, Qingdao (CN); Rong Wan, Qingdao (CN); Zhipeng Yao, Qingdao (CN); Yang Zhang, Qingdao (CN); Dapeng Zhao, Qingdao (CN)

(73) Assignee: Ocean University of China, Qingdao (CN)

( * ) Notice: Subject to any disclaimer, the term of this patent is extended or adjusted under 35 U.S.C. 154(b) by 594 days.

(21) Appl. No.: 16/812,568

(22) Filed: Mar. 9, 2020

(65) Prior Publication Data

US 2020/0305350 A1 Oct. 1, 2020

(30) Foreign Application Priority Data

Mar. 13, 2019 (CN) .......................... 201910187149.8

(51) Int. Cl.
*A01D 44/00* (2006.01)
*B63B 35/14* (2006.01)
*B63B 35/00* (2020.01)

(52) U.S. Cl.
CPC .............. *A01D 44/00* (2013.01); *B63B 35/00* (2013.01); *B63B 35/14* (2013.01)

(58) Field of Classification Search
CPC ........ A01D 44/00; A01D 44/02; B63B 35/00; B63B 35/14
See application file for complete search history.

(56) References Cited

FOREIGN PATENT DOCUMENTS

| CN | 106258191 A | * | 1/2017 | |
|---|---|---|---|---|
| CN | 106576585 A | * | 4/2017 | ............ A01D 44/00 |
| CN | 107226177 A | * | 10/2017 | |

\* cited by examiner

*Primary Examiner* — Christopher R Harmon

(57) ABSTRACT

The present invention discloses a kelp harvester. The kelp harvester includes a ship body and a U-shaped tripping piece, where two working chain racks are symmetrically arranged on both sides of the ship body; each working chain rack is provided with a chain and a chain driving device used to drive the chain to operate; multiple rope clamping devices are fixedly arranged on each chain; the rope clamping devices can clamp main ropes, so that when the chains operate, the rope clamping devices can drive the ship body to move along with the operation of the chains; the U-shaped tripping piece is rotatablely connected to the ship body through a hinge; and the ship body is further fixedly provided with a limiting baffle, and the limiting baffle limits the U-shaped tripping piece to stopping rotation when the U-shaped tripping piece is in a vertical state.

10 Claims, 3 Drawing Sheets

KELP HARVESTER

CROSS REFERENCE TO RELATED APPLICATION

This application claims the benefit of CN Patent Application No. 201910187149.8, which was filed Mar. 13, 2019 and is incorporated herein by reference as if fully set forth.

TECHNICAL FIELD

The present invention relates to the field of kelp harvesting technologies, and in particular, to a kelp harvester.

BACKGROUND

In China, most kelp is cultivated by using main ropes and culture ropes. Multiple connecting rings are fixedly arranged on a main rope, and the connecting ring is provided with a clamp slot. Each end of the culture rope is connected to a connecting rope, and a connecting rope of a culture rope is clamped into a clamp slot of each connecting ring, to connect the culture rope to the main rope. When kelp is cultivated on the culture rope, floating balls are evenly arranged on the main rope. When the connecting rope is withdrawn into the connecting ring from the clamp slot, the main rope can be separated from the culture rope. Currently, when an existing kelp harvester works, a culture rope cannot be disconnected from the main rope automatically after a main rope drives the culture rope to enter a cabin. In this case, manual operation is required, which will lead to a waste of manpower. Moreover, after the kelp harvester puts kelp into the cabin, the harvested kelp needs to be manually transported back to a dock and unloaded by a crane. This also wastes time and affects the kelp harvesting efficiency.

SUMMARY

An objective of the present invention is to provide a kelp harvester, to resolve the foregoing problems existing in the prior art, thereby implementing automatic tripping during the kelp harvesting and improving the kelp harvesting efficiency.

To achieve the above objective, the present invention provides the following solution:

The present invention provides a kelp harvester, including a ship body and a U-shaped tripping piece, where two working chain racks are symmetrically arranged on both sides of the ship body; each working chain rack is provided with a chain and a chain driving device that is used to drive the chain to operate; multiple rope clamping devices are fixedly arranged on each chain; the rope clamping devices can clamp main ropes, so that when the chains operate, the rope clamping devices can drive the ship body to move along with the operation of the chains; the U-shaped tripping piece is rotatablely connected to the ship body through a hinge; in an initial state, the U-shaped tripping piece is supported and limited in a horizontal state through a horizontal protruding edge that is fixedly arranged on the ship body, and an opening of the U-shaped tripping piece faces towards a traveling direction of the ship body; and the ship body is further fixedly provided with a limiting baffle, and the limiting baffle limits the U-shaped tripping piece to stopping rotation when the U-shaped tripping piece is in a vertical state.

Preferably, the kelp harvester further includes a transport ship and a conveyor belt and a conveyor belt driving device that are arranged on the ship body, where the conveyor belt driving device is configured to drive the conveyor belt to operate; the conveyor belt is parallel to the working chain rack; and the transport ship is detachably connected to the tail end of the ship body.

Preferably, the kelp harvester further includes a lifting and transportation device, where the lifting and transportation device includes a support column, a davit arm, and a lifting hook; a lower end of the support column is fixedly connected to the tail end of the ship body; the davit arm is rotatably connected to an upper end of the support column; the davit arm can rotate around a vertical axis; the lifting hook is fixedly connected to a lifting ring through a connector; and the lifting ring is slidably connected to the davit arm.

Preferably, the kelp harvester further includes a lifting device configured to move the working chain rack up and down, where the working chain rack is slidably connected to the ship body vertically.

Preferably, the chain driving device includes a drive sprocket, a driven sprocket, and a hydraulic motor, where the hydraulic motor is fixedly arranged on a lifting platform; the drive sprocket and the driven sprocket are respectively arranged at both ends of the working chain rack; an output shaft of the hydraulic motor is fixedly connected to the drive sprocket to drive the drive sprocket to rotate; and the drive sprocket is connected to the driven sprocket through the chain.

Preferably, the lifting device includes a first chain rack hydraulic cylinder, a second chain rack hydraulic cylinder, and a platform hydraulic cylinder, where the first chain rack hydraulic cylinder and the second chain rack hydraulic cylinder are fixedly arranged at the head end and the tail end of the ship body, respectively; a piston rod of the first chain rack hydraulic cylinder is fixedly connected to the head end of the working chain rack; a piston rod of the second chain rack hydraulic cylinder is fixedly connected to the tail end of the working chain rack; the platform hydraulic cylinder is fixedly arranged at the tail end of the ship body; and a piston rod of the platform hydraulic cylinder is fixedly connected to the lifting platform.

Preferably, the kelp harvester further includes a support plate, where one end of the support plate is hingedly connected to the ship body; the other end of the support plate is fixedly connected to a piston rod of a support plate hydraulic cylinder; and the support plate hydraulic cylinder is fixedly arranged on the ship body.

Preferably, a tensioner is arranged on the working chain rack and is configured to adjust the tension of the chain.

Preferably, the connector is a flexible connector.

Preferably, the ship body is provided with a propeller and a propeller driving device that is used to drive the propeller to rotate.

The present invention has the following technical effects compared with the prior art:

According to the kelp harvester provided in the present invention, two ends of a main rope are fastened; multiple rope clamping devices are fixedly arranged on each chain; and the rope clamping devices can clamp main ropes, so that when the chains operate, the rope clamping devices can drive the ship body to move along with the operation of the chains, to conduct kelp harvesting. A culture rope enters the opening of the U-shaped tripping piece by dragging by a main rope. The main rope continues to move backwards relative to the ship body by dragging by the chain, so as to drive the U-shaped tripping piece to rotate upwards. During tripping, one end of a clamp slot of a connecting ring is always in contact with the outer side surface of the U-shaped tripping piece. Due to friction force between the clamp slot and the U-shaped tripping piece, the end of the clamp slot of the connecting ring get stuck by the outer side surface of the U-shaped tripping piece. When the U-shaped tripping piece rotates upwards, a position of the culture rope is raised by support of the U-shaped tripping piece. When a height of a connecting rope connected to the culture rope is higher than that of the clamp slot of the connecting ring, the connecting rope is subjected to upward force, and moves upwards relative to the clamp slot of the connecting ring. As the U-shaped tripping piece continues to rotate, the connecting rope is gradually withdrawn into the connecting ring, and the culture rope is detached from the main rope to complete tripping. After tripping for one culture rope, the U-shaped tripping piece cannot continue to rotate due to the limitation by the limiting baffle. Due to the action of gravity, the U-shaped tripping piece automatically falls back to an original position and enters a next tripping cycle. In this way, automatic tripping can be implemented during the kelp harvesting. This improves the kelp harvesting efficiency, and reduces the labor intensity of operators.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

In the figures, 1—transport ship; 2—hydraulic control console; 3—hydraulic motor; 4—chain; 401—rope clamping device; 5—slide rail; 6—U-shaped tripping piece; 7—limiting baffle; 8—support plate; 9—tensioner; 10—first chain rack hydraulic cylinder; 11—ship body; 12—support plate hydraulic cylinder; 13—working chain rack; 14—conveyor belt; 15—drive sprocket; 16—second chain rack hydraulic cylinder; 17—lifting platform; 1801—support column; 1802—davit arm; 1803—lifting hook; 1804—lifting ring; 19—main rope; 20—culture rope; 21—kelp; and 22—connecting ring.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a kelp harvester, to resolve the foregoing problems existing in the prior art, to implement automatic tripping during kelp harvesting, and improve the kelp harvesting efficiency.

To make the above objects, features, and advantages of the present invention more obvious and easy to understand, the present invention will be further described in detail with reference to the accompanying drawings and the detailed description.

Figure 1:
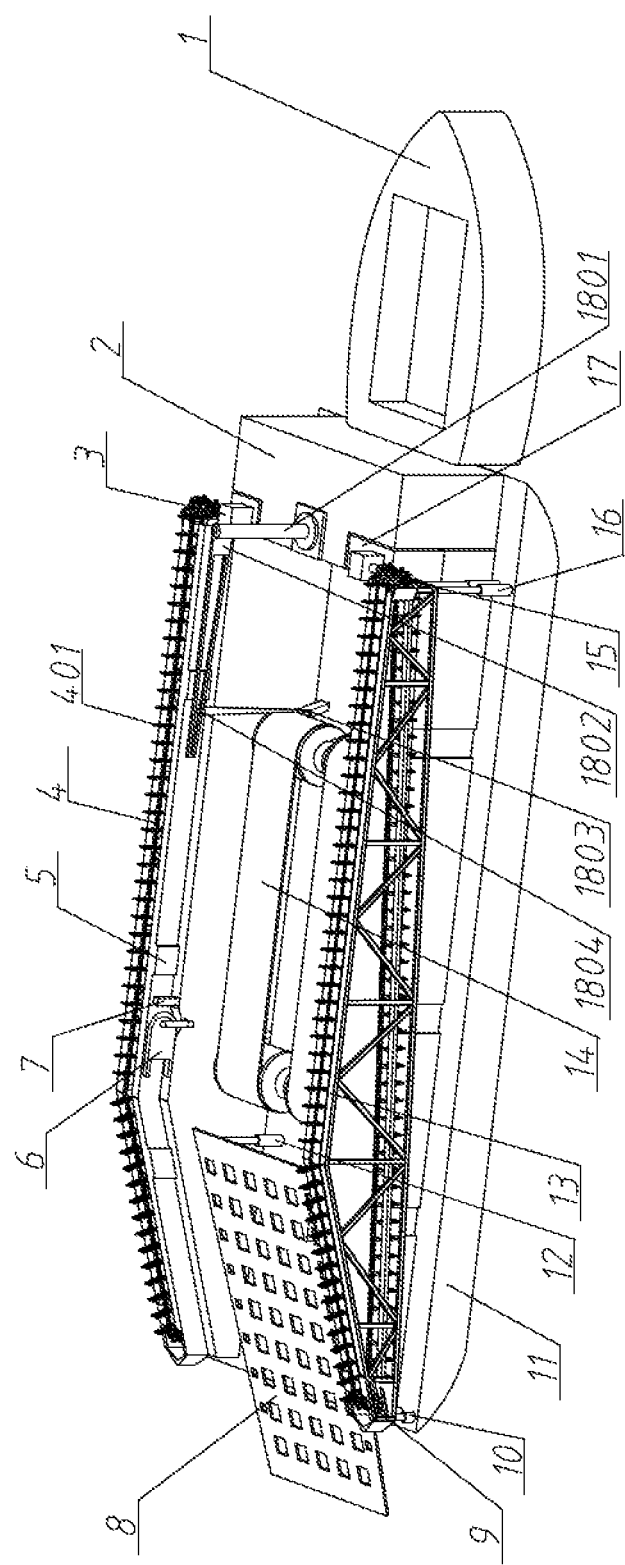
FIG. 1 is a schematic three-dimensional diagram of a kelp harvester according to the present invention.
Figure 2:
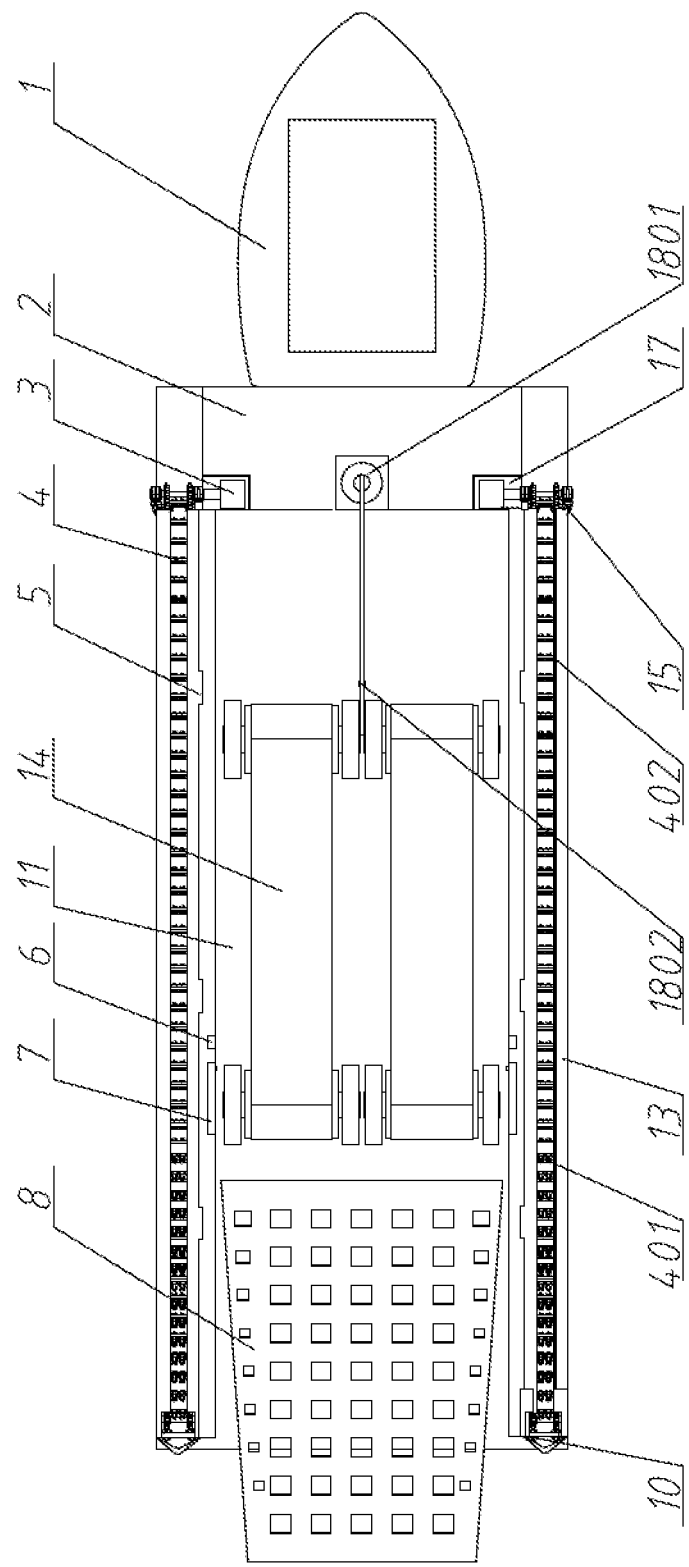
FIG. 2 is a top view of a kelp harvester according to the present invention.
Figure 3:
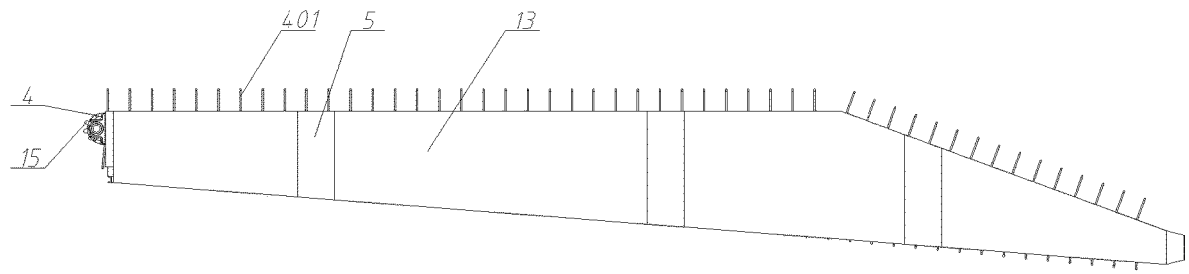
FIG. 3 is a front view of a working chain rack of a kelp harvester according to the present invention.

As shown in FIG. 1 to FIG. 3, the present invention provides a kelp harvester. In a specific embodiment of the present invention, the kelp harvester includes a ship body 11 and a U-shaped tripping piece 6, where two working chain racks 13 are symmetrically arranged on both sides of the ship body 11; each working chain rack 13 is provided with a chain 4 and a chain driving device that is used to drive the chain 4 to operate; multiple rope clamping devices 401 are fixedly arranged on each chain 4. Preferably, the rope clamping devices 401 are evenly arranged on the chain 4. The rope clamping devices 401 can clamp main ropes, so that when the chains 4 operate, the rope clamping devices 401 can drive the ship body 11 to move along with the operation of the chains 4. The U-shaped tripping piece 6 is rotatablely connected to the ship body 11 through a hinge, so that the U-shaped tripping piece 6 can rotate around a horizontal axis. In an initial state, the U-shaped tripping piece 6 is supported and limited in a horizontal state through a horizontal protruding edge that is fixedly arranged on the ship body 11, and an opening of the U-shaped tripping piece 6 faces towards a traveling direction of the ship body 11. The ship body 11 is further fixedly provided with a limiting baffle 7, and the limiting baffle 7 limits the U-shaped tripping piece 6 to stopping rotation when the U-shaped tripping piece 6 is in a vertical state.

Figure 4:
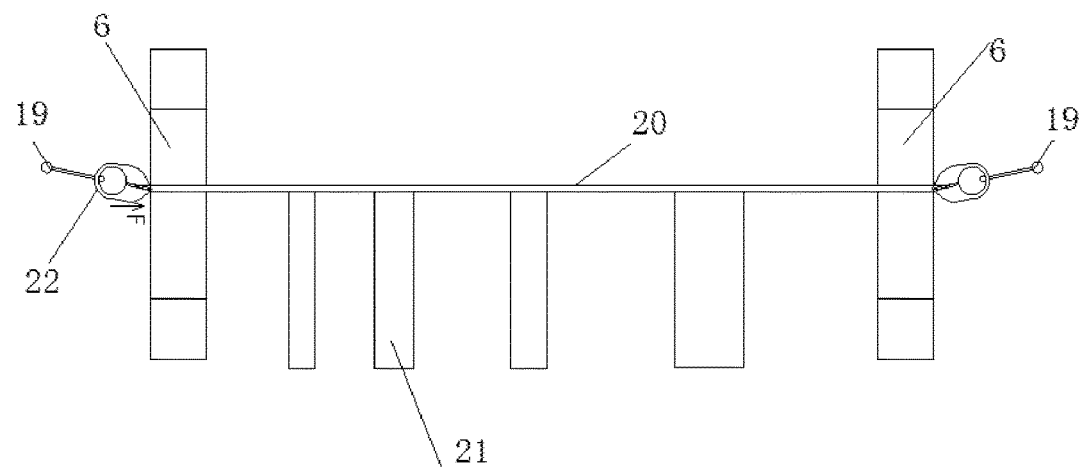
FIG. 4 is a state view before a U-shaped tripping piece of a kelp harvester provided in the present invention is used for tripping of a culture rope.
Figure 5:
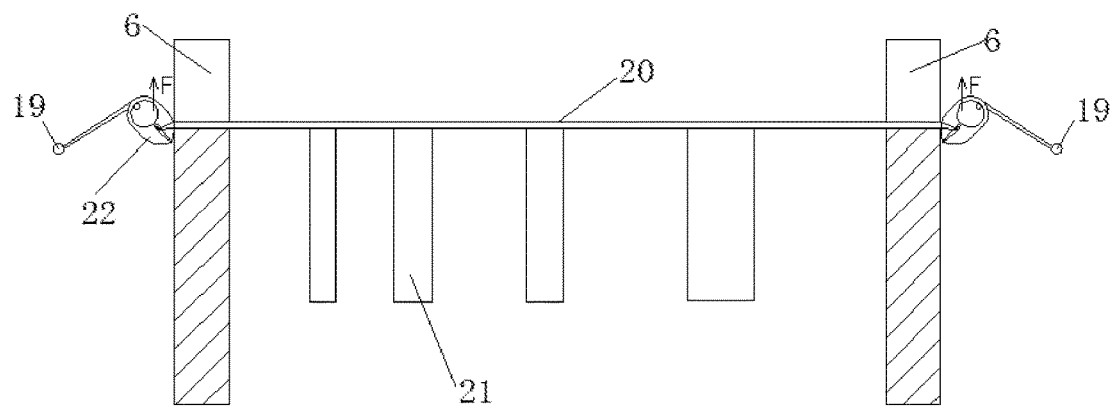
FIG. 5 is a state view when a U-shaped tripping piece of a kelp harvester provided in the present invention is used for tripping of a culture rope.

According to the kelp harvester provided in the present invention, two ends of a main rope 19 are fastened; multiple rope clamping devices 401 are fixedly arranged on each chain 4; the rope clamping device 401 includes two U-shaped racks arranged side by side; and an open end of the U-shaped rack is fixedly connected to the chain 4. The main rope 19 can be clamped by the two U-shaped racks after entering the space between the two U-shaped racks arranged side by side; and one floating ball can be accommodated between two adjacent rope clamping devices 401. The ship body is driven to move under the action of friction force generated between the U-shaped racks and the main rope, so as to harvest kelp 21. As shown in FIG. 4 and FIG. 5, a culture rope 20 enters the opening of the U-shaped tripping piece 6 by dragging by the main rope 19. The main rope 19 continues to move backwards relative to the ship body 11 by dragging by the chain 4, so as to drive the U-shaped tripping piece 6 to rotate upwards. During tripping, one end of a clamp slot of a connecting ring 22 is always in contact with the outer side surface of the U-shaped tripping piece 6. Due to friction force between the clamp slot and the U-shaped tripping piece 6, the end of the clamp slot of the connecting ring 22 get stuck by the outer side surface of the U-shaped tripping piece 6. When the U-shaped tripping piece 6 rotates upwards, a position of the culture rope 20 is raised by support of the U-shaped tripping piece 6. When a height of a connecting rope connected to the culture rope 20 is higher than that of the clamp slot of the connecting ring 22, the connecting rope is subjected to upward force, and moves upwards relative to the clamp slot of the connecting ring 22.

As the U-shaped tripping piece 6 continues to rotate, the connecting rope is gradually withdrawn into the connecting ring 22, and the culture rope 20 is detached from the main rope 19 to complete tripping. After tripping for one culture rope 20, the U-shaped tripping piece 6 cannot continue to rotate due to the limitation by the limiting baffle 7. Due to the action of gravity, the U-shaped tripping piece 6 automatically falls back to an original position and enters a next tripping cycle. In this way, automatic tripping can be implemented during the harvesting of the kelp 21. This improves the efficiency for harvesting the kelp 21, and reduces the labor intensity of operators.

In a specific embodiment of the present invention, the kelp harvester further includes a transport ship 1 and a conveyor belt 14 and a conveyor belt driving device that are arranged on the ship body 11, where the conveyor belt driving device is configured to drive the conveyor belt 14 to operate; the conveyor belt 14 is parallel to the working chain rack 13; and the transport ship 1 is detachably connected to the tail end of the ship body 11. The kelp 21 obtained after tripping falls onto the conveyor belt 14, and the conveyor belt 14 can transport the kelp 21 to a cabin of the ship body 11. After the cabin is fully filled with the kelp 21, the kelp 21 can be loaded into the transport ship 1. Then, the transport ship 1 transports the kelp 21 back to a dock. By using this method, harvesting and transportation can be simultaneously conducted. This saves time, implements mechanical transportation, and overcomes the shortcoming of low manpower efficiency.

In a specific embodiment of the present invention, the kelp harvester further includes a lifting and transportation device, where the lifting and transportation device includes a support column 1801, a davit arm 1802, and a lifting hook 1803; a lower end of the support column 1801 is fixedly connected to the tail end of the ship body 11; the davit arm 1802 is rotatably connected to an upper end of the support column 1801; the davit arm 1802 can rotate around a vertical axis at 360°; the lifting hook 1803 is fixedly connected to a lifting ring 1804 through a connector; and the lifting ring 1804 is slidably connected to the davit arm 1802. A davit arm driving device used to drive the davit arm 1802 to rotate can be arranged on the support column 1801. A lifting ring driving device used to drive the lifting ring 1804 to slide back and forth can also be arranged on the davit arm 1802. This can implement automatic lifting and transportation. When the kelp 21 needs to be loaded into the transport ship 1, the lifting and transportation device at the tail end of the ship body 11 can directly transfer the harvested kelp 21 to the transport ship 1 at a working site. This improves the loading and transportation efficiency and can save labor.

In a specific embodiment of the present invention, the kelp harvester further includes a lifting device configured to move the working chain rack 13 up and down, where the working chain rack 13 is slidably connected to the ship body 11 vertically; multiple vertical slide rails 5 are arranged on the working chain rack 13; vertical grooves corresponding to the vertical slide rails 5 are arranged on the ship body 11; and the slide rails 5 slide in the grooves.

The chain driving device includes a drive sprocket 15, a driven sprocket, and a hydraulic motor 3, where the hydraulic motor 3 is fixedly arranged on a lifting platform 17; the drive sprocket 15 and the driven sprocket are respectively arranged at both ends of the working chain rack 13; an output shaft of the hydraulic motor 3 is fixedly connected to the drive sprocket 15 to drive the drive sprocket 15 to rotate; and the drive sprocket 15 is connected to the driven sprocket through the chain 4.

The lifting device includes a first chain rack hydraulic cylinder 10, a second chain rack hydraulic cylinder 16, and a platform hydraulic cylinder, where the first chain rack hydraulic cylinder 10 and the second chain rack hydraulic cylinder 16 are fixedly arranged at the head end and the tail end of the ship body 11, respectively; a piston rod of the first chain rack hydraulic cylinder 10 is fixedly connected to the head end of the working chain rack 13; a piston rod of the second chain rack hydraulic cylinder 16 is fixedly connected to the tail end of the working chain rack 13; the platform hydraulic cylinder is fixedly arranged at the tail end of the ship body 11; and a piston rod of the platform hydraulic cylinder is fixedly connected to the lifting platform 17. When the first chain rack hydraulic cylinder 10 and the second chain rack hydraulic cylinder 16 are used to move the working chain rack 13 up and down, the platform hydraulic cylinder is used to move the lifting platform 17 up and down, to maintain normal operation of the chain 4.

Since the main rope 19 is clamped on the rope clamping devices 401 of the chain 4, a floating ball on the main rope 19 is also limited by the chain 4. The lifting device is arranged to move the chain 4 up and down, which can be adapt to the rise and fall of the water surface to adjust the tension of the main rope 19. In case of falling tide, if the main rope 19 is excessively loose, the first chain rack hydraulic cylinder 10 and the second chain rack hydraulic cylinder 16 extend outwards, and the working chain rack 13 is moved upwards, so that the main rope 19 is tensioned. In this way, the kelp harvester can keep moving forwards, thereby improving the efficiency for harvesting the kelp 21. In case of rising tide, if the main rope 19 is excessively tensioned, the first chain rack hydraulic cylinder 10 and the second chain rack hydraulic cylinder 16 are drawn back, and the working chain rack 13 is moved downwards. This can avoid excessive tension of the main rope 19.

In a specific embodiment of the present invention, the kelp harvester further includes a support plate 8, where one end of the support plate 8 is hingedly connected to the ship body 11; the other end of the support plate 8 is fixedly connected to a piston rod of a support plate hydraulic cylinder 12; and the support plate hydraulic cylinder 12 is fixedly arranged on the ship body 11. The head end of the support plate 8 extends out of the ship body 11. During operation of the kelp harvester, after the kelp 21 is loaded into the cabin of the ship body 11 by using the support plate 8 as a track, the conveyor belt 14 conveys the kelp 21 to a working range of the lifting and transportation device. During traveling of the ship body, the support plate hydraulic cylinder 12 is drawn back, and the support plate 8 restores to a state parallel to the bottom of the cabin, reducing the traveling resistance.

A hydraulic control console 2 is arranged at the tail end of the ship body 11, and is configured to provide hydraulic oil for the hydraulic motor 3, the first chain rack hydraulic cylinder 10, the second chain rack hydraulic cylinder 16, the platform hydraulic cylinder, and the support plate hydraulic cylinder 12.

In a specific embodiment of the present invention, a tensioner 9 is arranged on the working chain rack 13 of the kelp harvester, and is configured to adjust the tension of the chain 4.

In a specific embodiment of the present invention, the connector of the kelp harvester is a flexible connector.

In a specific embodiment of the present invention, the ship body 11 of the kelp harvester is provided with a propeller and a propeller driving device that is used to drive the propeller to rotate. The propeller driving device is fixedly connected to the ship body 11. An output shaft of the propeller driving device is connected to the propeller to drive the propeller to rotate. By rotating the propeller, additional power is provided for traveling of the kelp harvester, to overcome tidal resistance.

Several examples are used for illustration of the principles and implementations of the present invention. The description of the embodiments is only used to help illustrate the method and its core ideas of the present invention. In addition, persons skilled in the art can make various modifications in terms of specific embodiments and scope of application in accordance with the teachings of the present invention. In conclusion, the content of this specification shall not be construed as a limitation to the present invention.

What is claimed is:

1. A kelp harvester, comprising:
a ship body, wherein two working chain racks are symmetrically arranged on both sides of the ship body; each working chain rack is provided with a chain and a chain driving device that is used to drive the chain to operate; multiple rope clamping devices are fixedly arranged on each chain; the rope clamping devices can clamp main ropes, so that when the chain operates, the rope clamping devices can drive the ship body to move along with the operation of the chain; and
a U-shaped tripping piece, wherein the U-shaped tripping piece is rotationally connected to the ship body through a hinge; in an initial state, the U-shaped tripping piece is supported and limited in a horizontal state through a horizontal protruding edge that is fixedly arranged on the ship body, and an opening of the U-shaped tripping piece faces towards a traveling direction of the ship body; and the ship body is further fixedly provided with a limiting baffle, and the limiting baffle limits the U-shaped tripping piece to stopping rotation when the U-shaped tripping piece is in a vertical state.

2. The kelp harvester according to claim 1, further comprising a transport ship and a conveyor belt and a conveyor belt driving device that are arranged on the ship body, wherein the conveyor belt driving device is configured to drive the conveyor belt to operate; the conveyor belt is parallel to the working chain rack; and the transport ship is detachably connected to the tail end of the ship body.

3. The kelp harvester according to claim 2, further comprising a lifting and transportation device, wherein the lifting and transportation device comprises a support column, a davit arm, and a lifting hook; a lower end of the support column is fixedly connected to the tail end of the ship body; the davit arm is rotatably connected to an upper end of the support column; the davit arm can rotate around a vertical axis; the lifting hook is fixedly connected to a lifting ring through a connector; and the lifting ring is slidably connected to the davit arm.

4. The kelp harvester according to claim 1, further comprising a lifting device configured to move the working chain rack up and down, wherein the working chain rack is slidably connected to the ship body vertically.

5. The kelp harvester according to claim 4, wherein the chain driving device comprises a drive sprocket, a driven sprocket, and a hydraulic motor; the hydraulic motor is fixedly arranged on a lifting platform; the drive sprocket and the driven sprocket are respectively arranged at both ends of the working chain rack; an output shaft of the hydraulic motor is fixedly connected to the drive sprocket to drive the drive sprocket to rotate; and the drive sprocket is connected to the driven sprocket through the chain.

6. The kelp harvester according to claim 5, wherein the lifting device comprises a first chain rack hydraulic cylinder, a second chain rack hydraulic cylinder, and a platform hydraulic cylinder; the first chain rack hydraulic cylinder and the second chain rack hydraulic cylinder are fixedly arranged at the head end and the tail end of the ship body, respectively; a piston rod of the first chain rack hydraulic cylinder is fixedly connected to the head end of the working chain rack; a piston rod of the second chain rack hydraulic cylinder is fixedly connected to the tail end of the working chain rack; the platform hydraulic cylinder is fixedly arranged at the tail end of the ship body; and a piston rod of the platform hydraulic cylinder is fixedly connected to the lifting platform.

7. The kelp harvester according to claim 1, further comprising a support plate, wherein one end of the support plate is hingedly connected to the ship body; the other end of the support plate is fixedly connected to a piston rod of a support plate hydraulic cylinder; and the support plate hydraulic cylinder is fixedly arranged on the ship body.

8. The kelp harvester according to claim 1, wherein a tensioner is arranged on the working chain rack and is configured to adjust the tension of the chain.

9. The kelp harvester according to claim 3, wherein the connector is a flexible connector.

10. The kelp harvester according to claim 3, wherein the ship body is provided with a propeller and a propeller driving device that is used to drive the propeller to rotate.

* * * * *